Figure 1:
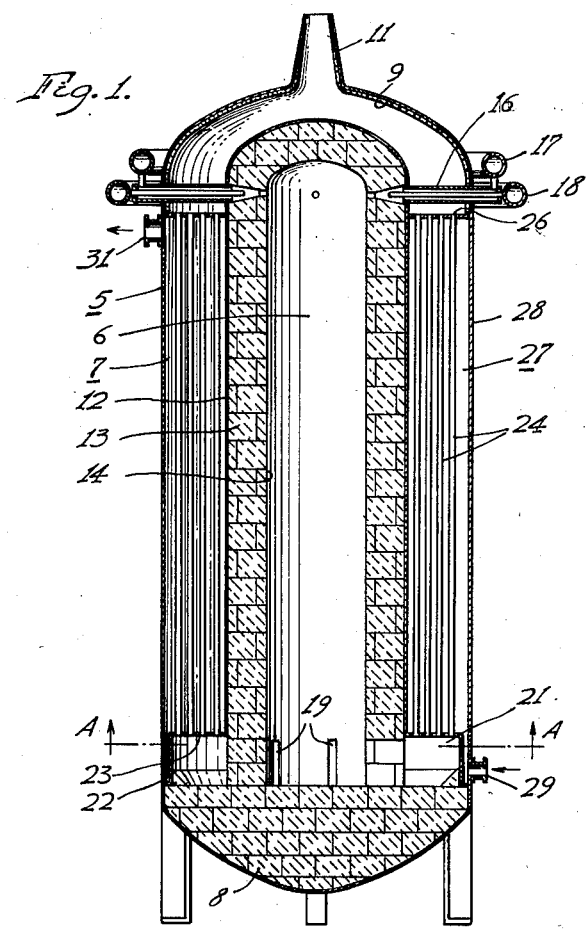

Oct. 7, 1952     C. L. CRAWFORD     2,613,145

APPARATUS FOR PRODUCING SYNTHESIS GAS

Filed Dec. 30, 1948

INVENTOR.
Clarence L. Crawford.
BY
*Attorney*

Patented Oct. 7, 1952

2,613,145

UNITED STATES PATENT OFFICE 2,613,145

APPARATUS FOR PRODUCING SYNTHESIS GAS

Clarence L. Crawford, Plum Township, Allegheny County, Pa., assignor to Gulf Research & Development Company, Pittsburgh, Pa., a corporation of Delaware Application December 30, 1948, Serial No. 68,280

1 Claim. (Cl. 48—196)

This invention relates to an apparatus for carrying out reactions at advanced temperatures and superatmospheric pressures. More particularly the invention relates to an apparatus for producing a gas comprising hydrogen and carbon monoxide, i. e. a synthesis gas by partially reacting hydrocarbons with oxygen at elevated temperatures and superatmospheric pressures.

A process for the production of Fischer-Tropsch synthesis gas comprises introducing a mixture of natural gas and oxygen into a conversion zone in which conversion temperatures of the order of 1800° to 2300° F. and pressures of the order of 150 to 650 pounds per square inch are maintained. The composition of the charge mixture is such as to produce upon conversion a mixture of conversion products comprising desirable proportions of carbon monoxide and hydrogen and to evolve sufficient heat to maintain the conversion tube at the conversion temperature.

The conversion products initially formed are not in thermodynamic equilibrium at the conversion temperature and therefore the conversion zone should be sufficiently long to provide an equilibrium zone wherein the products are maintained at an elevated equilibrium temperature above 1700° F. until thermodynamic equilibrium is substantially established. The equilibrium composition at this temperature is the desired composition. However, since the equilibrium composition varies with temperature, the actual composition would change toward a new equilibrium composition at a new temperature if allowed sufficient time. To stabilize the desired composition and obtain synthesis gas under conditions desirable for introduction into a synthesis converter system, the mixture at the conversion temperature should be immediately and substantially instantaneously cooled or quenched to a substantially unreactive temperature, preferably a temperature of below 1300° F.

One of the important problems involved in practicing a process of this type is that of avoiding any substantial loss of heat from the conversion zone or products prior to the time the products are subjected to substantially instantaneous cooling. It is essential that the cooling device employed be closely adjacent to the exit of the conversion tube to avoid heat losses in transferring the products from the tube to the cooling device since slow loss of heat prior to the rapid cooling would produce undesirable changes in gas composition. This problem presents material difficulties in preventing heat transfer, particularly transfer by radiation from one zone to the other.

The apparatus of the present invention provides an effective solution of the problem of preventing the transfer of heat from the reaction or conversion zone in which a high-temperature reaction is carried out, to a cooling zone. Moreover, the apparatus comprises a compact and efficient arrangement of the several elements required to operate a process of generating synthesis gas.

The apparatus of the invention includes an elongated conversion tube having heat retentive walls and a gas quench cooler comprising a plurality of narrow heat exchange tubes terminating in upper and lower tube sheets, the tubes being disposed in parallel arrangement and surrounded by a chamber for a fluid heat exchange medium, all contained in a single pressure-tight vessel. The gas quench cooler is positioned around the conversion tube. Conduits are provided leading from the conversion tube to the gas quench cooler. Conversion gases pass in one direction through the conversion tube, through the conduits and in the other direction through the heat exchange tubes.

Figure 2:
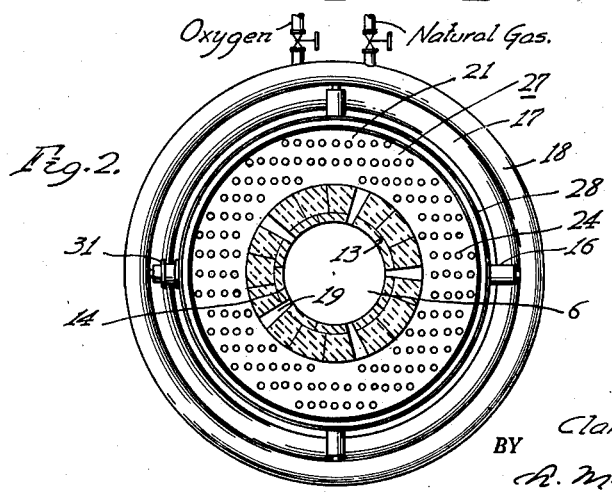

The invention will be understood by reference to the accompanying drawing, hereby made a part of this specification, in which Figure 1 is a vertical sectional view of an apparatus embodying the invention and Figure 2 is a cross-sectional view taken along the lines A—A of Figure 1.

The apparatus disclosed in the drawing consists of a pressure-tight vessel 5, containing an elongated open conversion tube 6, and a quench cooler 7 which surrounds the conversion tube 6. The vessel 5 is of steel, is partially insulated with bottom insulating bricks 3 and top insulating bricks 9, and contains an outlet 11 leading from the top of the vessel. The conversion tube 6 is centered within vessel 5 and is formed of a steel cylinder 12 containing heat retentive insulating bricks 13, forming an annular heat retentive wall 14, and bottom insulating bricks 8. The conversion tube is provided with radial inlets in the form of long nozzles 16 at the top thereof which extend without vessel 5. The nozzles 16 are fed by an upper oxygen manifold 17 and a lower natural gas manifold 18. These manifolds are supplied by the valved lines shown on Figure 2. Conduits 19 which lead from the interior of the conversion tube to an annular space or chamber 21 are formed by arranging heat retentive bricks 13 to form apertures in the bottom of wall 14 below the bottom of steel cylinder 12. The chamber 21 is formed by the lower portion of refractory wall 14, the water wall 22, bottom insulating bricks 8, and the lower tube sheet 23 of quench cooler 7. The quench cooler is arranged as an annulus around the cylinder 12 and consists of a plurality of narrow steel gas cooling tubes 24 positioned in parallel arrangement between the lower tube sheet 23 and an upper tube sheet 26. A chamber 27 adapted to contain a cooling medium such as water surrounding the tubes 24 is formed by the upper and lower tube sheets, the cylinder 12 and the vertical wall 28 of vessel 5. The cooling medium is introduced through inlet 29 and withdrawn through outlet 31.

The operation of the apparatus will be described in connection with a process for the production of synthesis gas. A mixture of natural gas and oxygen at an elevated temperature of about 1000° F. and a pressure of about 300 pounds per square inch is formed in nozzles 16 and introduced into conversion tube 6. The conversion tube is maintained at a temperature of about 2500° F. and a pressure of about 300 pounds per square inch, this temperature being obtained by the conversion of previous increments of the natural gas and oxygen mixture. The entering mixture is raised rapidly to its conversion temperature and is converted to conversion products comprising carbon monoxide, hydrogen, carbon dioxide and steam. These conversion products move downwardly in conversion tube 6 at a rate such that on reaching the bottom of the tube, they are of substantially equilibrium composition at the conversion temperature of 2500° F. The reactions occurring in conversion tube 6 produce a considerable amount of heat, loss of which is prevented in the apparatus described by the heat retentive wall 14 and bottom insulating bricks 8.

In order to cool or quench this equilibrium mixture substantially instantaneously, the conversion products are passed through conduits 19 into annular chamber 21 and without substantial reduction of temperature are introduced into the bottom of gas cooling tubes 24 where they are quickly cooled so as to pass from the heat exchange tubes at a temperature of about 900° F. The pressure of the exit gases will be substantially the pressure in the conversion tube 6; i. e. about 300 pounds per square inch.

The apparatus disclosed is effective to prevent any premature cooling of the conversion products because the loss of heat by radiation to the quench cooler is substantially completely avoided. Thus, the only conversion gases which are in a position to radiate heat to the quench cooler are the gases contained in chamber 21 and these gases almost immediately pass into the heat exchange tubes. There is substantially no reduction of temperature of the conversion gases until they enter the gas cooling tubes 24.

Due to the structure of the quench cooler, and particularly the fact that the hot gases pass through the parallel gas cooling tubes 24 which are in contact with water acting as a cooling medium, substantially instantaneous cooling is accomplished which is effective to stabilize and fix the composition of the conversion products at the composition attained at the elevated conversion temperature of 2500° F.

The cooling medium employed is preferably water which, depending upon the plant requirements, is converted into high or low pressure steam.

It will be seen that the apparatus disclosed has the important advantage in addition to that of permitting a substantially instantaneous quench cooling of the conversion products of providing means for protecting the conversion zone from excessive cooling.

It will be recognized by those skilled in the art that the apparatus disclosed in the drawing can be modified in many ways within the scope of the invention. For example, the position of entering and exit conduits may be the reverse of that shown; i. e. the unit may be in effect inverted. In such case, the flow of gases through the conversion tube and the quench cooler will be in the opposite direction from that described. While it is important when carrying out extremely high-temperature reactions and using water as the cooling medium that the hot gases flow upwardly through the quench cooler, satisfactory results are obtained when carrying out lower-temperature reactions, particularly when using a different cooling medium, by causing the hot gases to flow downwardly through the quench cooler.

Obviously many modifications and variations of the invention as hereinabove set forth may be made without departing from the spirit and scope thereof and therefore only such limitations should be imposed as are indicated in the appended claim.

I claim:

An apparatus for producing synthesis gas by conversion of hydrocarbons which comprises in combination in a pressure-tight vessel, an elongated conversion tube centrally and axially located in said vessel, closed at its upper and lower ends and insulated over substantially all of its inner surface by insulating heat retentive walls, said elongated conversion tube containing at least one inlet conduit at the top thereof extending from without the said vessel and a plurality of slots disposed in the bottom of and extending through the side wall of said conversion tube, cooling means comprising a lower tube sheet, a water wall beneath said lower tube sheet and surrounded by the lower portion of said pressure-tight vessel, vertical heat exchange tubes open at each end, an upper tube sheet, and a heat exchange chamber, said cooling means surrounding said conversion tube within said reaction vessel with its said lower tube sheet positioned at a higher vertical point than but immediately adjacent to said slots, and an annular chamber surrounding said conversion tube closed at the lower end by an insulating heat retentive wall and bounded also by the insulating heat retentive side wall of the lower end of said conversion tube containing said slots, by said water wall, and by said lower tube sheet, said annular chamber being in communication with the interior of said conversion tube by means of said slots and with said heat exchange tubes, whereby hot reaction gases formed in said conversion tube flow downwardly through said conversion tube while they are maintained at an elevated equilibrium temperature by said insulating heat retentive walls of said conversion tube and pass from said conversion tube through said slots to said annular chamber while avoiding any substantial transfer of heat by radiation from said conversion tube to said cooling means and then flow upwardly through said cooling means.

CLARENCE L. CRAWFORD.

REFERENCES CITED

The following references are of record in the file of this patent:

UNITED STATES PATENTS

| Number | Name | Date |
|---|---|---|
| 1,296,194 | LaCour | Mar. 4, 1919 |
| 1,734,310 | Taylor | Nov. 5, 1929 |
| 1,816,110 | Cannon | July 28, 1931 |
| 1,936,623 | Frintzel | Nov. 28, 1933 |
| 2,142,409 | Pontremoli | Jan. 3, 1939 |
| 2,173,115 | Hutto | Sept. 19, 1940 |
| 2,189,365 | Kucher | Feb. 6, 1940 |
| 2,247,181 | Berhoudar | June 24, 1941 |
| 2,383,924 | Way et al. | Aug. 28, 1945 |